United States Patent [19]
Saitoh

[11] Patent Number: 5,943,430
[45] Date of Patent: *Aug. 24, 1999

[54] TELEVISION STEREOPHONIC AUDIO SYSTEM

[75] Inventor: Hitoshi Saitoh, Saitama-ken, Japan

[73] Assignee: Kabushiki Kaisha Toshiba, Kanagawa-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/798,151

[22] Filed: Feb. 10, 1997

Related U.S. Application Data

[63] Continuation of application No. 08/523,742, Sep. 5, 1995, abandoned, which is a continuation of application No. 08/159,232, Nov. 30, 1993, abandoned.

[30] Foreign Application Priority Data

Dec. 25, 1992 [JP] Japan ................................. 4-346906

[51] Int. Cl.[6] ................................................. H04R 5/02
[52] U.S. Cl. ......................................... 381/160; 181/155
[58] Field of Search ............................ 381/24, 156, 160; 181/155

[56] References Cited

U.S. PATENT DOCUMENTS

| | | | |
|---|---|---|---|
| 3,707,201 | 12/1972 | Domin et al. | 181/318 B |
| 4,982,436 | 1/1991 | Cowan | 381/156 |
| 5,005,201 | 4/1991 | Rumreich et al. | 381/24 |
| 5,115,882 | 5/1992 | Woody | 381/160 |
| 5,144,670 | 9/1992 | Negishi | 381/24 |
| 5,181,247 | 1/1993 | Holl | 381/24 |

FOREIGN PATENT DOCUMENTS 0 356 871 A2  8/1989  European Pat. Off. .

*Primary Examiner*—Thomas D. Lee
*Assistant Examiner*—Stephen Brinich
*Attorney, Agent, or Firm*—Banner & Witcoff, Ltd.

[57] ABSTRACT

A television set speaker system enables stereophonic audio reproduction with a "live" feeling when a television set receives programming in stereo. Such a system includes two front speakers for radiating sound in a forward direction from a cathode ray tube screen and reflection type directional intensifier speakers provided on the right and left sides of the top of the television set for radiating sound diagonally forward and outward in relation to the cathode ray tube screen.

14 Claims, 12 Drawing Sheets

STRAIGHT-TYPE

R-SHAPE

R-SHAPE

STRAIGHT-TYPE
MODIFICATION

SHIFTED CENTRAL
AXIS

SHIFTED CENTRAL
AXIS

SHIFTED CENTRAL
AXIS

TELEVISION STEREOPHONIC AUDIO SYSTEM

This is a continuation of application Ser. No. 08/523,742 filed Sep. 5, 1995, now abandoned, which is a continuation of 08/159,232 filed Nov. 30, 1993, now abandoned.

FIELD OF INVENTION

The present invention relates to a television speaker system, and more particularly to a system for enabling accurate reproduction of stereo audio in a television set located in a room.

BACKGROUND OF INVENTION

A prior art television system containing a built-in multiple function audio system has left and right speakers for receiving stereo audio or two-tone audio. FIG. 14 shows such a television set.

The television set shown in FIG. 14 and FIG. 15 includes a television set cabinet 11, a cathode ray tube 12, a left front speaker 13, and a right front speaker 14. The speakers 13 and 14 are positioned on the front panel of the television cabinet 11. In FIG. 15, the direction and spread of the sound waves emanating from the speakers 14 and 15 are represented when the television set is located in a room 18.

According to the prior art, the speakers in a television have been located either on each side of the cathode ray tube screen or above and below the cathode ray tube screen. Recently, since larger wide-screen television sets have become popular, screens have increased in size. The feasibility of such wide-screen television sets depends on the user's ability to fit the larger screen television set in a room at home. With space being an important purchaser concern, television sets are being designed to minimize the size of the unit. Accordingly, the space for installation of speaker units on television sets has become increasingly smaller.

Thus, relatively small speakers positioned around the cathode ray tube screen reproduce the audio for the television set. Consequently, the system lacks a "live" feeling as if the listener were attending a live event, e.g., a concert, with little sense of stereo sound such as movement of sound from left speaker to right speaker.

Since the distance between the left and right speakers on a television set is short, the stereo sound is relatively poor when compared with the stereo sound of a speaker arrangement associated with a typical stereo system. Currently, high definition and wide-screen televisions with an aspect ratio of 16:9 are entering the marketplace. These televisions are wider than conventional televisions. Thus, to minimize the increase in size of the television set due to wider screens, narrow slim style speakers positioned on each side of the television set have been used. However, the reproduction of good-sounding stereo audio remains a problem.

Apart from television sets, in the general audio field non-directional speaker systems which employ reflectors have been used. FIG. 16 is a vertical cross-section of a non-directional speaker system. The speaker system includes a speaker cabinet 21, a speaker for low-frequency sound (woofer) 22, a speaker for high-frequency sound (tweeter) 23, a non-directional reflection speaker 24, a non-directional conical reflector 25, and a netting 26 for holding the non-directional reflector 25 above the non-directional speaker 24. The FIG. 16 system attempts to improve the sound in a horizontal direction. Sound can be radiated in the horizontal direction by roughly positioning the conical reflector 25 in front of the reflection speaker 24 which faces in an upward direction perpendicular to the direction in which the sound radiates, as opposed to speakers 22 and 23 which radiate the sound in a forward direction.

Another system on the market, depicted in FIG. 17, in which speakers 13 and 14 are fitted on both sides of the cathode ray tube 12 on the television set cabinet 11. Sound outputted from the speakers 14 and 15 reflects off the reflectors 15 and 16 positioned on both sides of the television set. Such an outputting arrangement is necessary because the cathode ray tube 12 occupies a large area so that to minimize the size of the television set, the speakers 13 and 14 are located on the side thereof. Therefore, to direct the sound in a forward direction relative to the television set when the speakers 13 and 14 are located on the side of the television set cabinet, the reflectors 15 and 16 must be employed.

However, with the system of FIG. 17, it is difficult to manufacture the reflectors 15 and 16 to properly protrude from the side of the television cabinet 11. Further, the "live" feeling and quality stereo sound cannot be fully achieved.

In a high definition broadcast system, stereophonic sound can be achieved by using a 3-1 system 4-channel stereo. Thus, by using a speech dedicated center speaker, two front speakers as left and right speakers and a "surround" rear speaker, stereophonic sound from four directions can be achieved.

FIG. 18 shows a prior art style 3-1 system 4-channel stereo in a television set speaker system. This embodiment includes a television cabinet set 11, a cathode ray tube 12, left and right front stereo speakers 13 and 14, and a speech dedicated center 17. An external speaker (not illustrated) may be plugged into terminals located at the back of the television set cabinet 11. According to this arrangement, the sound is concentrated on the center channel, therefore providing clear sound reproduction. However, the sound becomes flat like in a monaural system and an accompanying reduction in stereophonic quality occurs. Additionally, a space problem results with the positioning of three speakers in front of the television set.

SUMMARY OF INVENTION

As described above, with prior art television set speaker systems, stereophonic sound cannot be achieved due to the lack of a live feeling and poor sound quality. An object of the present invention is to provide a television set speaker system which overcomes the aforementioned deficiencies.

According to the invention, stereo sound diagonally radiates forward from a left speaker and a right speaker in relation to a cathode ray tube face of a television set by employing reflection type directional intensifier speakers. Consequently, the sound reflects off the walls of the room in traveling to the left and right ears of a viewer. Stereophonic sound reproduction can be achieved since the viewer can identify sounds emanating from each speaker. Also, speech and other sounds can be made clearly audible from the front speakers.

An exemplary embodiment of the speaker system of the present invention includes a first speaker on the front of a television set for radiating sound in a forward direction outward from the television set, a second speaker mounted on the television set for radiating sound outward from the television set in a first direction different from the forward direction, and a third speaker mounted on the television set for radiating sound outward from the television set in a second direction different from the first direction and the forward direction. The second speaker and the third speaker may be reflection type directional intensifier speakers for radiating sound in the first direction and the second direction, the first direction being outward and left of the forward direction, the second direction being outward and right of the forward direction. The second speaker may include a first mouth mounted on a left side of a top of the television set for radiating sound in the first direction, while the third speaker may include a second mouth mounted on a right side of the top of the television set for radiating sound in the second direction.

The second speaker can be mounted on a left side of a top of the television set and the third speaker can be mounted on a right side of the top of the television set. Typically, the second speaker and the third speaker each include a vertically upward facing diaphragm, a reflector plate located in front of the diaphragm, a mouth for radiating sound horizontally on a periphery of the reflector plate, and a mounting member including a shield for reflecting radiated sound towards the mouth. The reflector plate of each of the second speaker and the third speaker has a first shape in a direction facing the diaphragm and a second shape in a direction facing the mouth. The reflector plate of each speaker is rotatable on its respective mounting member.

Another exemplary embodiment of a speaker system for a television set includes a first speaker positioned on the front of the television set for radiating sound in a forward direction outward from the television set, a second speaker located on top of the television set including a diaphragm, and means, located in front of the diaphragm, for radiating sound in first and second directions different from the forward direction. The sound radiating means may include a reflector plate for radiating sound in the first direction, and a horn-shaped sound passage for radiating sound in the second direction different from the first direction. The sound radiating means may also include a reflector plate having a first shape in a left direction and a second shape in a right direction, wherein the sound quality varies according to the first shape and the second shape.

BRIEF DESCRIPTION OF THE DRAWINGS

The present invention will now be described in more detail with reference to preferred embodiments of the invention, given only by way of example, and illustrated in the accompanying drawings in which:

FIG. 5b is a plan view of the top speaker of FIG. 5a;

FIG. 11b shows a plan view of the embodiment of FIG. 11a;

FIG. 12b shows a plan view of the embodiment of FIG. 12a;

DETAILED DESCRIPTION

While the following description is in the context of television speaker systems, it will be understood by those skilled in the art that the present invention may be applied to other applications such as computer monitor speaker systems.

Figure 1:
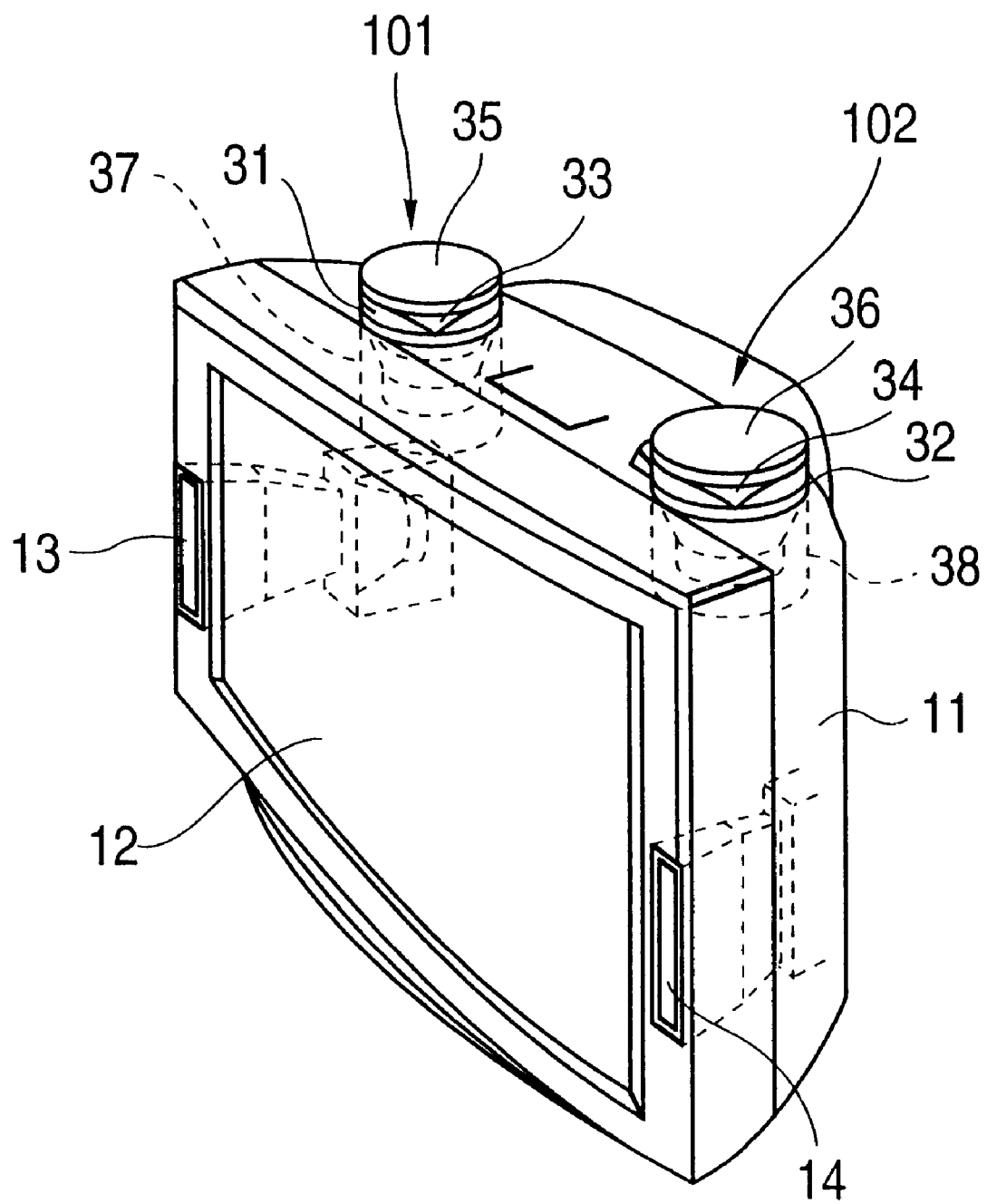
FIG. 1 shows an oblique view of a television set speaker system according to an embodiment of the present invention.

An embodiment of a television set speaker system of the present invention, as depicted in FIG. 1, includes a television set cabinet 11, a cathode ray tube screen 12, and front speakers 13 and 14 located respectively on the left and right sides of the cathode ray tub screen 12. Also, the system includes reflection type directional intensifier speakers 101 and 102 provided with the center axis of the speakers 101 and 102 pointing in a vertical, typically a ceiling-ward, direction. The center axis of the speakers 101 and 102 is respectively located on the left and right sides on the top of the television set. The reflection type directional intensifier speakers 101 and 102 are configured to provide sound output directed within a specific range of horizontal directions. According to this configuration, the top speakers 31 and 32 are configured so that their central axes point in a vertical direction and their diaphragms face upward. Directional reflectors located in front of the diaphragms of each speaker are provided for reflecting sound waves in a horizontal direction while, at the same time, radiating reflected waves within a specified horizontal directional range.

The reflection type direction intensifier speaker 101 includes a top speaker 31, a reflector 33 for altering the direction that sound waves are radiated, a mounting 35 for supporting the reflector 33 while radiating the sound waves reflected by the reflector 33 in a predetermined direction, and a back cabinet 37 which prevents sound from escaping through the rear periphery of the top speaker. Likewise, reflection type directional intensifier speaker 102 includes a top speaker 32, reflector 34, mounting 36, and back cabinet 38 for performing the same functions. Approximately conical non-directional reflectors 33 and 34 are positioned in front of the top speakers 31 and 32 and supported by the mountings 35 and 36. The reflectors 33 and 34 can be designed as separate moldings which are bonded together with mountings 35 and 36, respectively, or the reflectors 33 and 34 may be incorporated together in a single element with their respective mountings 35 and 36.

Figure 2:
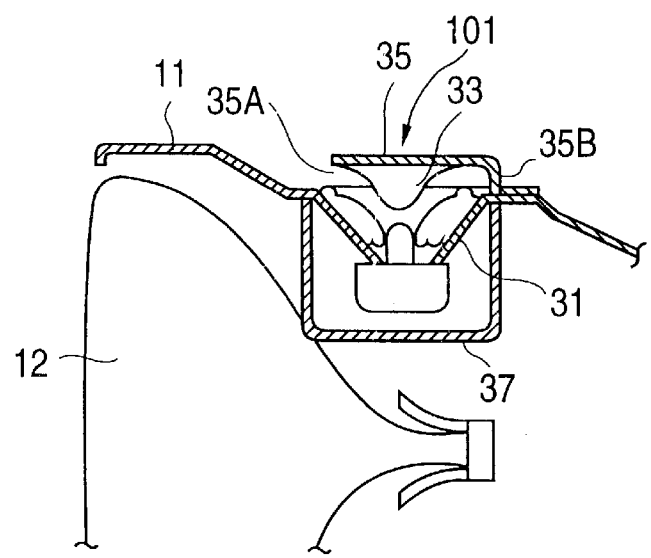
FIG. 2 shows a vertical cross-section of part of a reflection type directional intensifier speaker according to the embodiment of FIG. 1.

FIG. 2 shows a cross-sectional view of a portion of the reflection type directional intensifier speaker 101 of FIG. 1. The mounting 35 includes a mouth 35a which radiates sound in a horizontal direction and a shield 35b for reflecting sound towards the mouth 35a. The reflector 33 enclosed within the mounting reflects sound towards both the shield 35b and the mouth 35a of the mounting.

Figure 3:
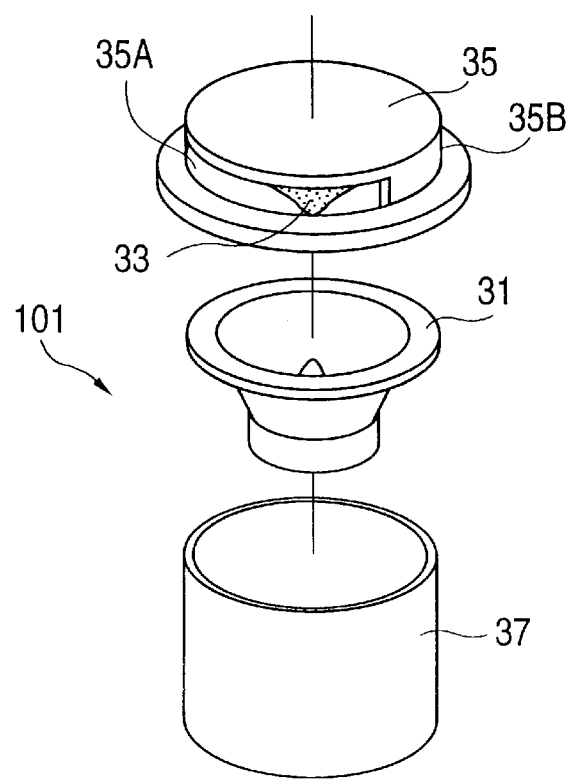
FIG. 3 shows an exploded oblique view of a top speaker unit according to the present invention.

FIG. 3 depicts an exploded view of the reflection type directional intensifier speaker 101. FIG. 3 includes the mounting 35 with the reflector 33 mounted therein, and the back cabinet 37 for the top speaker 31. In this embodiment, the reflector 33 and the mounting 35 are formed as a single element by molding. Specifically, the mounting 35 is molded into a shape which provides a reflector portion 33 for performing reflection.

Referring to FIG. 1, a television set may, for example, be configured so that left and right audio signals supplied to the top speakers 31 and 32 are the same as the signals supplied to the front speakers 13 and 14. In such a configuration, the top speaker 31 may be connected to the audio signal line of the front speaker 13 and the top speaker 32 may be connected to the audio signal line of the front speaker 14.

Figure 4:
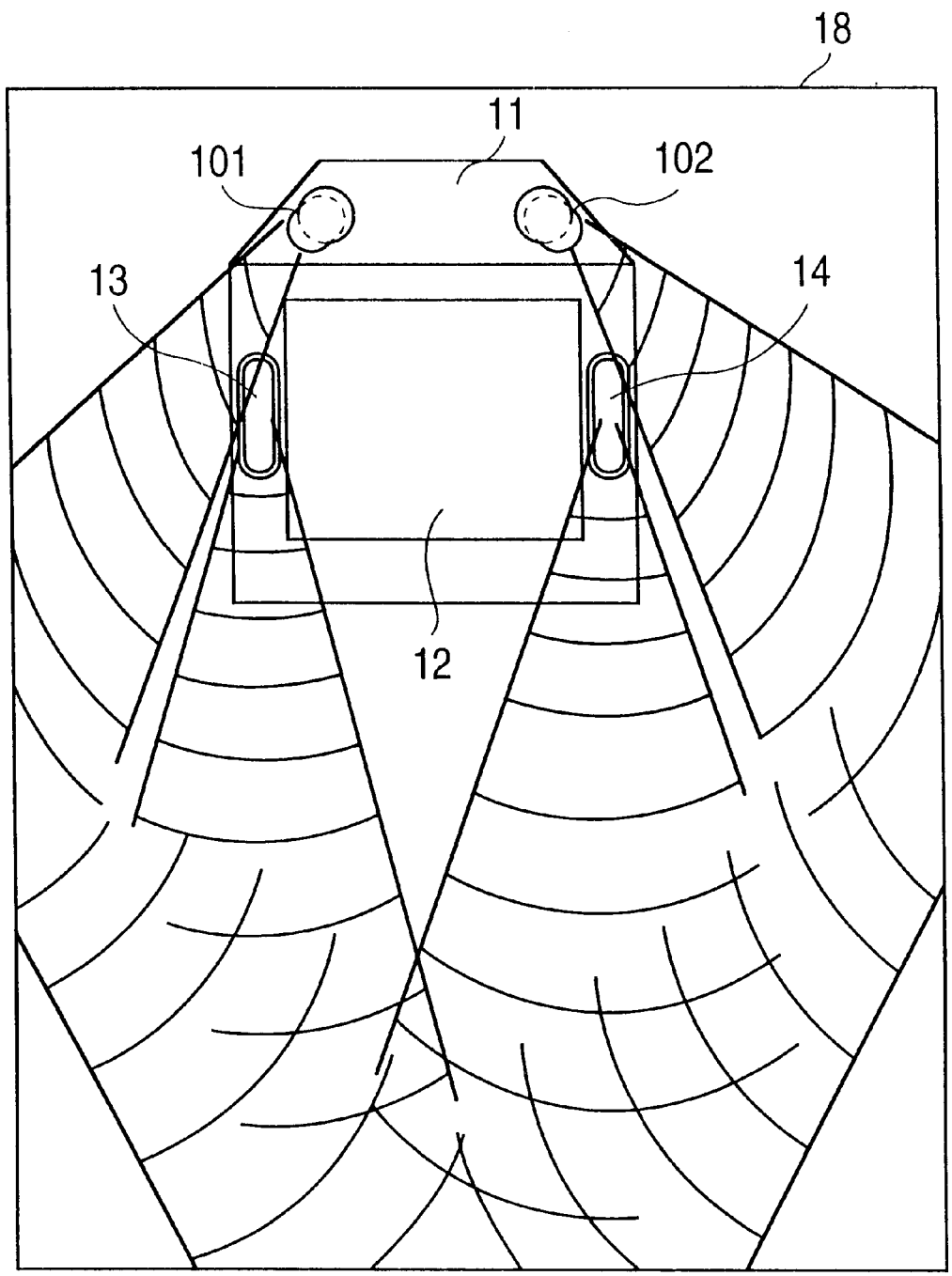
FIG. 4 illustrates the sound wave pattern for a speaker system in a forward direction in a room according to the embodiment of FIG. 1.

FIG. 4 shows the sound wave patterns emanating from each speaker according to this configuration when a television set is installed in a room 18. As can be readily seen in FIG. 4, the sound waves produced by each reflection type directional intensifier speaker 101 and 102 radiate diagonally forward and outward from the television cabinet 11. Further, sound waves propagated toward the walls of the room 18 reflect toward a location in front of the television set where a viewer/user may be located. Therefore, a user located in front of the television set can hear the combination of sound waves from the left and right speakers 13 and 14 and the sound waves, including high and low frequencies, from the left and right reflection type directional intensifier speakers 101 and 102.

Figure 15:
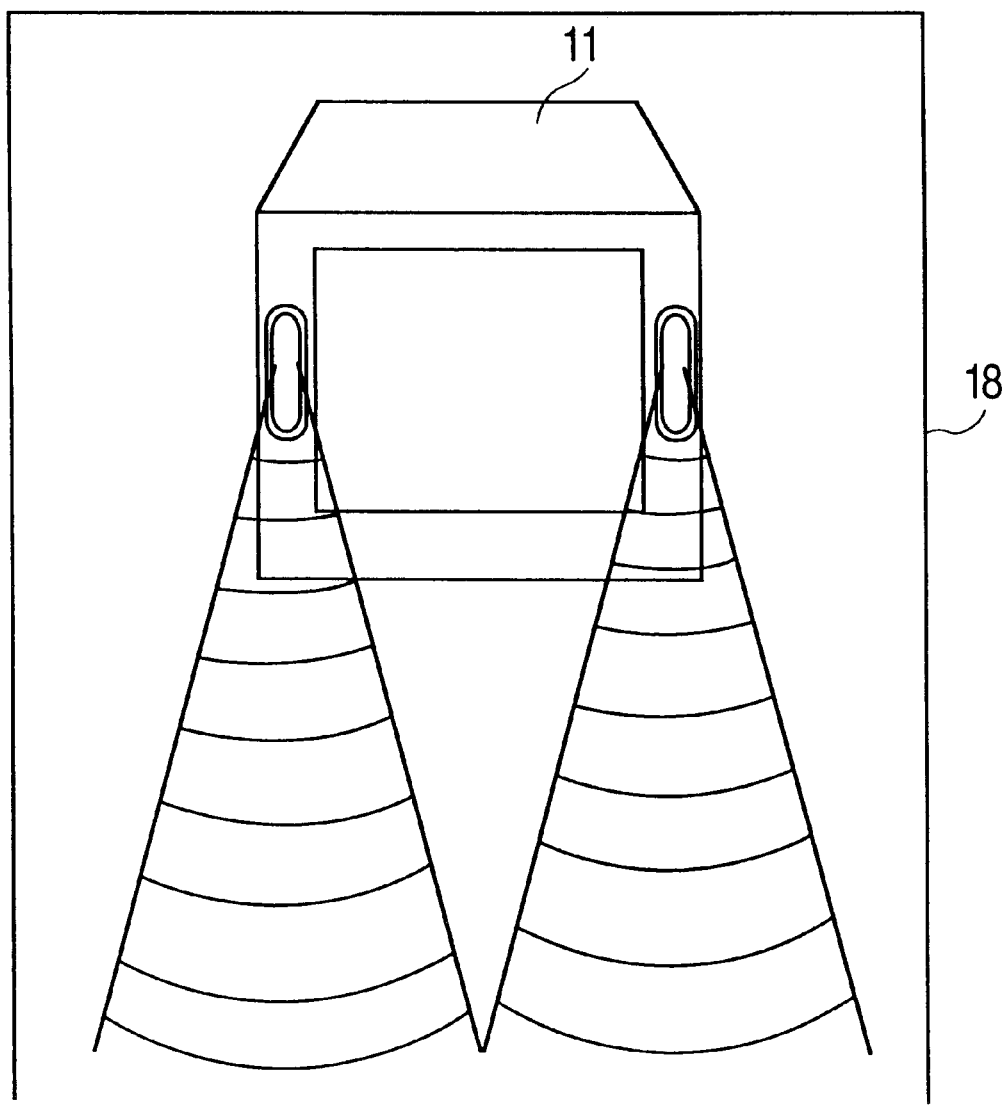
FIG. 15 illustrates the sound wave pattern for a speaker system in a forward direction in a room according to the conventional system of FIG. 14.
Figure 16:
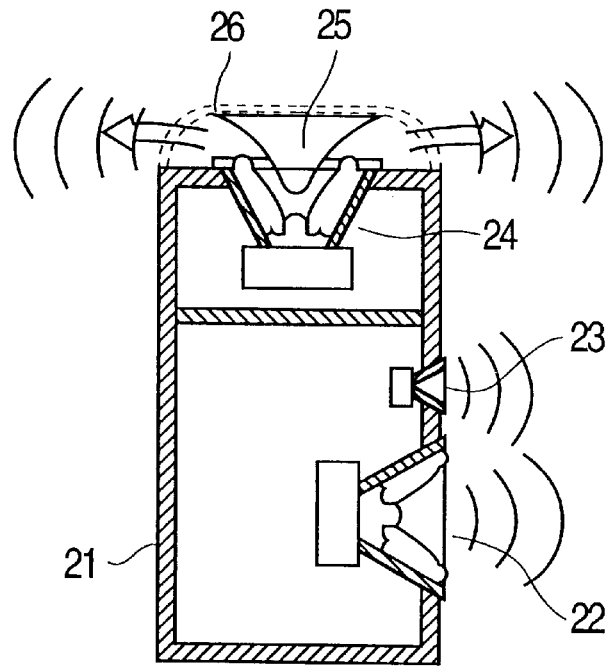
FIG. 16 shows a vertical cross-section of part of a speaker configuration according to a conventional television speaker system.
Figure 17:
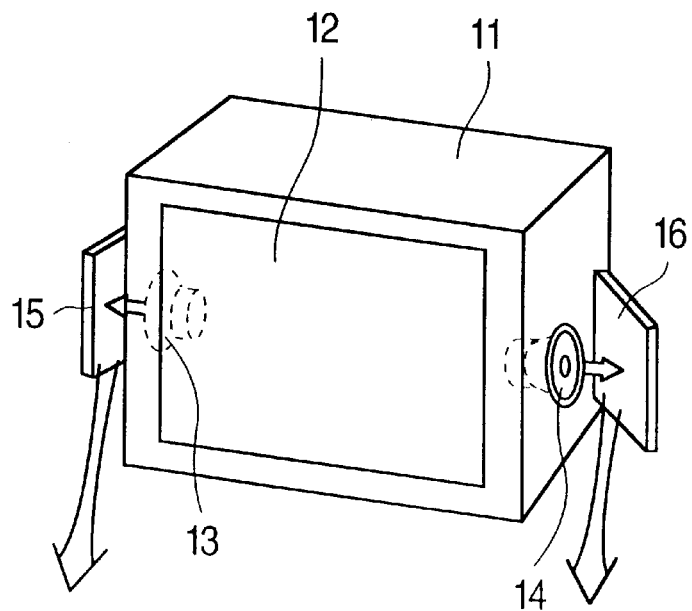
FIG. 17 shows an oblique view of another conventional television set speaker system.

In the prior art, as discussed previously with reference to FIG. 15, since there are only left and right front speakers and the distance between the speakers is small, the stereo sound is relatively poor when compared with the stereo sound generated by a speaker arrangement in a typical stereo system. It is difficult to detect the stereo sound when the speakers are positioned so closely and produce sound in the same relative direction. In contrast, according to the embodiment represented in FIG. 4, sound radiates diagonally forward and outward from the top speakers 31 and 32 and is received by a user after reflection off the walls. Since some of the sound produced by the speaker arrangement of the present invention is directed to reflect off the walls before being received by the user, the user can more readily sense the stereo sound with good fidelity.

According to the present invention, the audio signals supplied to the top speakers 31 and 32 of the reflection type directional intensifier speakers 101 and 102 can be manipulated in various ways depending on the desired acoustic effect. For example, as opposed to supplying the same signals to the reflection type directional intensifier speakers 101 and 102 and the front speakers 31 and 32, a time difference may be applied to the audio signals for the front speakers 13 and 14. Also, the signals supplied to the front speakers 13 and 14 can be subjected to signal processing, such as phase processing with a phase shift.

If the signals supplied to the top speakers 31 and 32 are the same as those supplied to the front speakers 13 and 14, the top speaker 31 may be connected in parallel with the audio signal line for the front speaker 13 and the top speaker 32 may be connected in parallel with the audio signal line for the front speaker 14. In this embodiment, the volume of the front speakers and the top speakers will be approximately the same because the left speakers 13 and 31 and the right speakers 14 and 32 are each driven by a single amplifier. Thus, the left speakers 13 and 31 connected in parallel and the right speakers 14 and 32 connected in parallel may each be driven by separate amplifiers to allow for separate adjustment of the volume of all the speakers.

The stereo sound of a television set speaker system can be substantially influenced by the acoustic characteristics of its environment. For example, the room including the reflective characteristics of the walls therein can alter the sound significantly. Accordingly, the mouths 35a and 36a of the respective reflection type directional intensifier speakers 101 and 102, and more particularly the direction in which sound radiates therefrom, can be adjusted to match the environment where the system is located. For example, sound can be radiated in a direction outward and to the right and left of a forward direction from the front of the television set. As a result, stereo sound reproduction can be achieved because the sound direction of the reflector type directional intensifier speakers is always different from the front speakers.

Figure 5A:
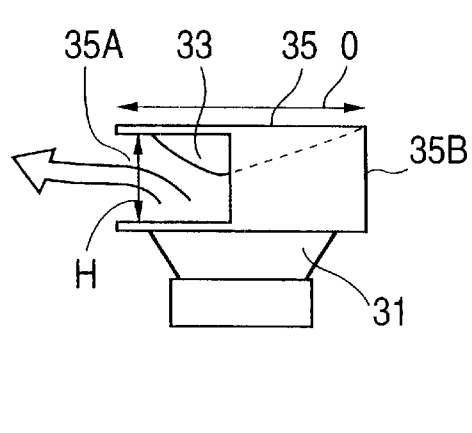
FIG. 5a shows a side view of a top speaker mounted on a mounting according to the present invention.
Figure 5B:
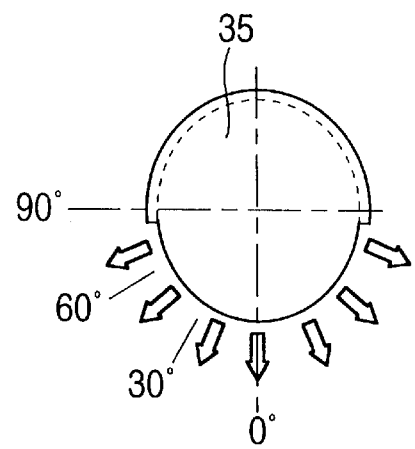

FIG. 5a shows a side view of a top speaker 31 mounted on a mounting 35 according to the present invention. FIG. 5b is a plan view of the top speaker of FIG. 5a. Although increasing the height H of the mouth 35a would enhance stereo sound quality, to effectively minimize the size of the unit and to maintain a desirable appearance there must be a reasonable limit to the height H. The symbol D represents the diameter of the mounting 35. The angular aperture of the mouth 35a is approximately 180°. Exemplary values of H and D according to the present invention are H=20 mm and D=105 mm. When the reflector 33 is a roughly conical non-directional reflector, sound waves emerge from the top speaker 31 in the direction of the arrows in FIG. 5b. Taking the front center line of the 180° mouth as 0°, the energy distribution of the sound waves in the directions 0°, 30°, and 60° are approximately equal. Thus, the system has a property that the sound produced therefrom is relatively equal in a substantial portion of the output direction.

Figure 6A:
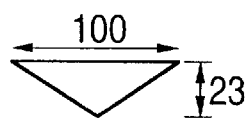
FIGS. 6a–6g illustrate side views of individual reflector embodiments according to the present invention.
Figure 6B:
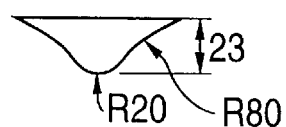
Figure 6C:
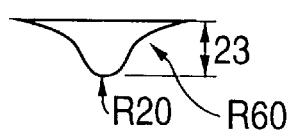
Figure 6D:
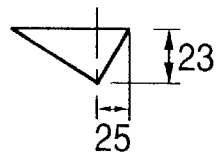
Figure 6E:
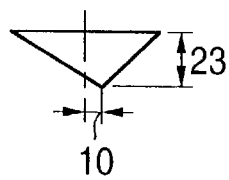
Figure 6F:
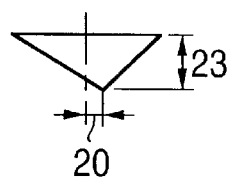
Figure 6G:
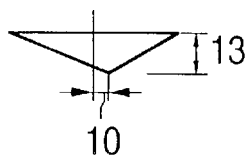

FIGS. 6a–6g show various exemplary conical shapes of the reflector 33 according to the present invention. FIG. 6a depicts a straight type conical reflector. In FIGS. 6b and 6c, cone-shaped reflectors having R-shaped ridge lines are shown; FIG. 6b having a large radius R and FIG. 6c having a small radius R. In FIG. 6d, the reflector is roughly conical in the 180° direction with the central axis as a boundary, the other half of the reflector having a sloped shaped with an acute inclination. FIGS. 6e–6g show reflectors of roughly conical shapes with the central axis being shifted. In FIG. 6e the central axis shift is small while in FIG. 6f the central axis shift is large. The height of the reflector is shortened in FIG. 6g. Other combinations of conical shapes with varying inclinations not shown are considered within the scope of the present invention.

Figure 7:
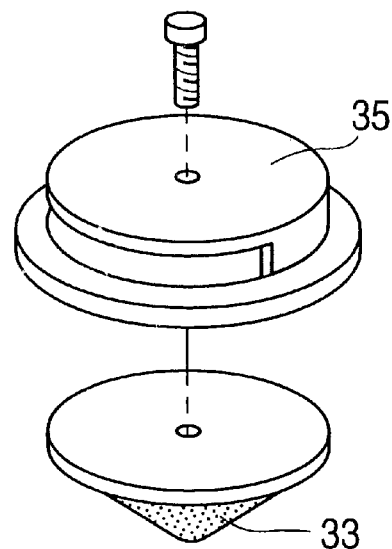
FIG. 7 shows an exploded oblique view of an arrangement of a reflector and mounting according to an embodiment of the present invention.

FIG. 7 depicts another embodiment of the reflector 33 and the mounting 35 combination. As shown in FIG. 7, the reflector 33 and the mounting 35 are formed as separate pieces and combined by a connecting device (e.g., a screw) through their central axes. If the reflector 33 is shaped as in FIGS. 6d–6g, by making the reflector 33 rotatable on the mounting 35, the sound quality can be altered by changing the direction in which the sound propagates. This results because the cross-sectional shape of the reflector 33 varies due to the rotation causing sound quality to change in the output direction. Accordingly, the sound quality of the speaker system can be altered in conjunction with the acoustic environment, e.g., room.

Figure 8:
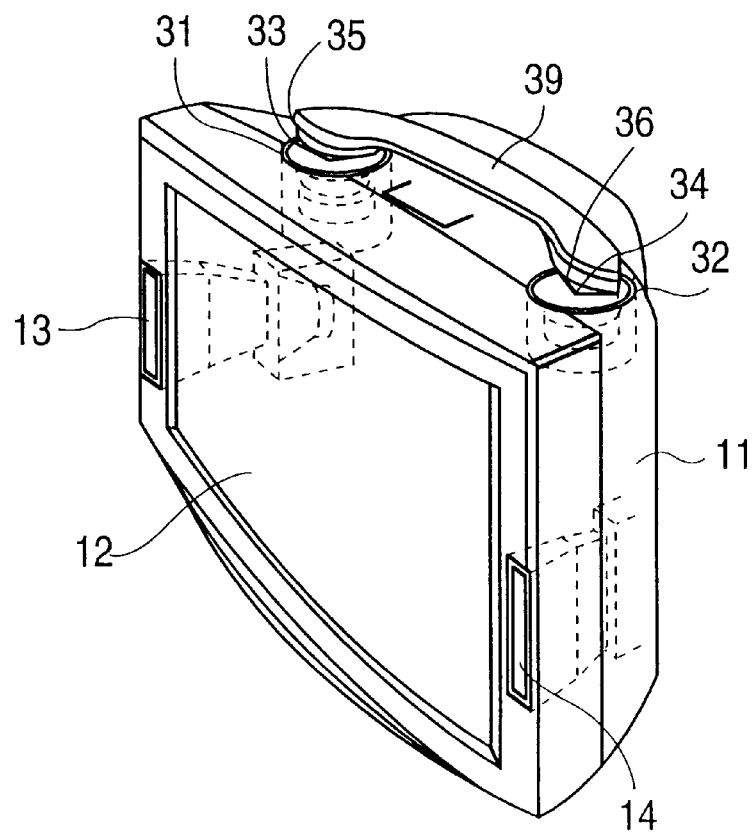
FIG. 8 shows an oblique view of a television set speaker system according to another embodiment of the present invention.
Figure 9:
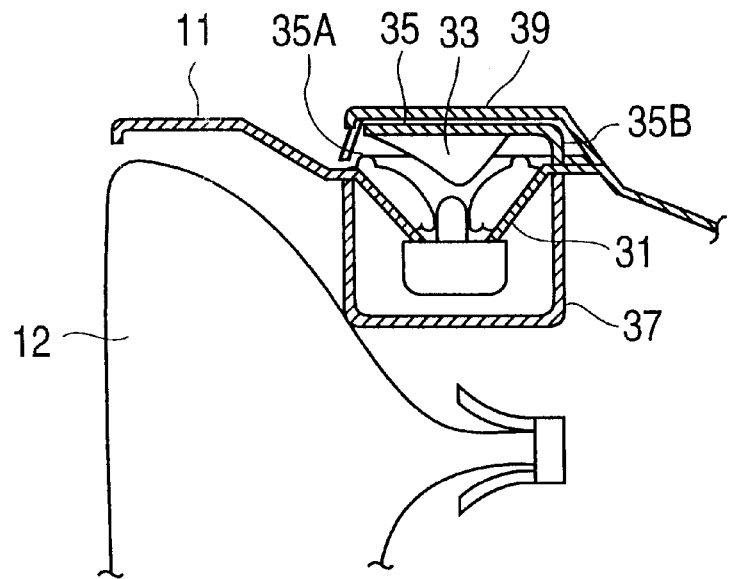
FIG. 9 shows a vertical cross-section of part of a reflection type directional intensifier speaker according to the embodiment of FIG. 8.

FIG. 8 represents another embodiment of a television set speaker system. FIG. 9 shows a vertical cross-sectional view of a reflection type directional intensifier speaker used in the FIG. 8 system. In addition to the elements of the embodiment of the present invention shown in FIGS. 1 and 2, a decorative molding 39 is provided which covers the left and right reflection type directional intensifier speakers. Specifically, the molding 39 covers the exposed portions of the left and right mountings 35 and 36.

Figure 10:
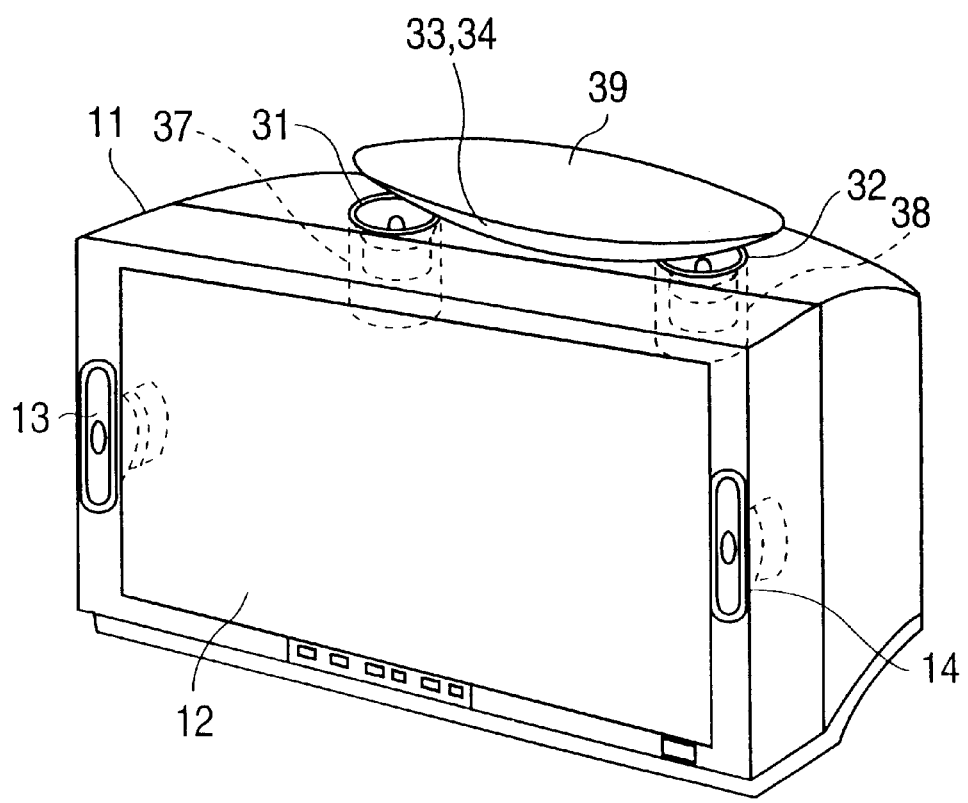
FIG. 10 shows an oblique view of television set speaker system according to yet another embodiment of the present invention.

FIG. 10 represents another embodiment of the present invention in which respective left and right reflectors 33 and 34 are formed into a one-piece molding. The mountings 35 and 36 are further molded therewith, and molded thereon is a decorative molding 39. The remaining elements are the same as shown in FIG. 8.

Figure 11A:
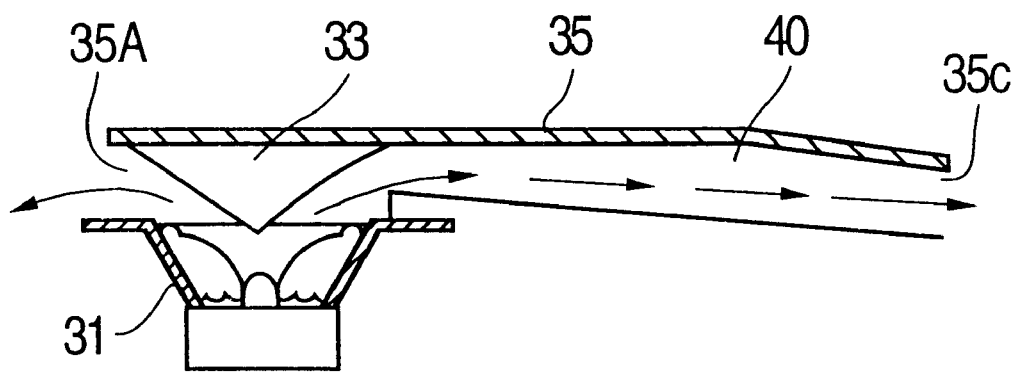
FIG. 11a shows a side cross-sectional view of a speaker arrangement embodiment according to the present invention.
Figure 11B:
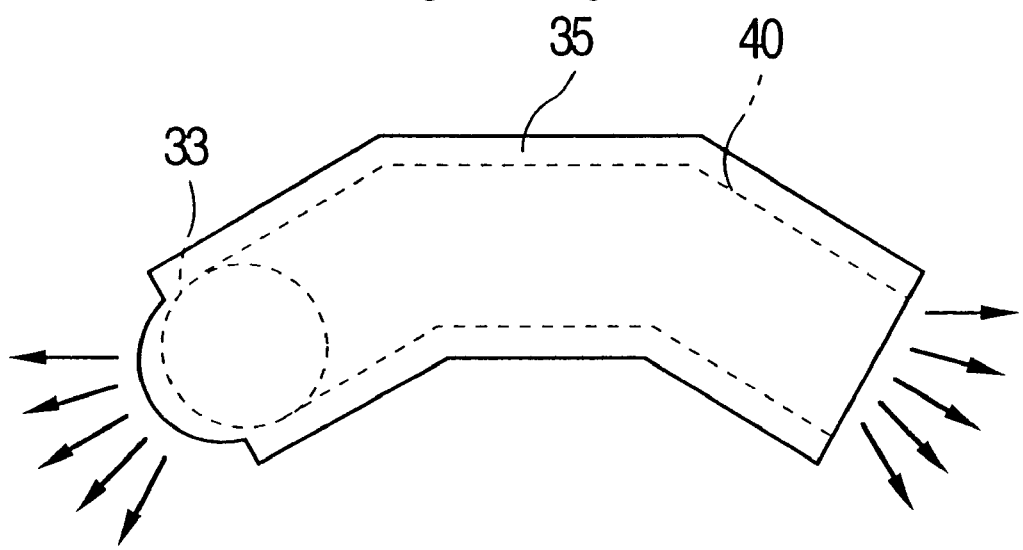

It is possible to produce a stereophonic effect by altering the phases of the left and right stereo channels without simply outputting the sounds from the top speakers in a forward direction. For example, to reduce cost the television set speaker system can include a single top speaker. A stereophonic effect be accomplished by manipulating reflector shape and horn characteristics which is known to one of ordinary skill in the art. FIG. 11a shows a cross-section of a top speaker for a television speaker system with a single top speaker and FIG. 11b is a plan view of such a system.

In FIG. 11a, a mounting 35, including its associated reflector 33, is positioned in front of a single top speaker 31 arranged on top of a television set cabinet. As shown in FIGS. 11a and 11b, sound waves are directly radiated by the reflector 33 and out of the top speaker 31 through mouth 35a on one side of the reflector 33. Sound waves reflected on the other side of the reflector pass through a horn shaped sound passage 40 and are radiated outward through a passage mouth 35c.

Figure 12A:
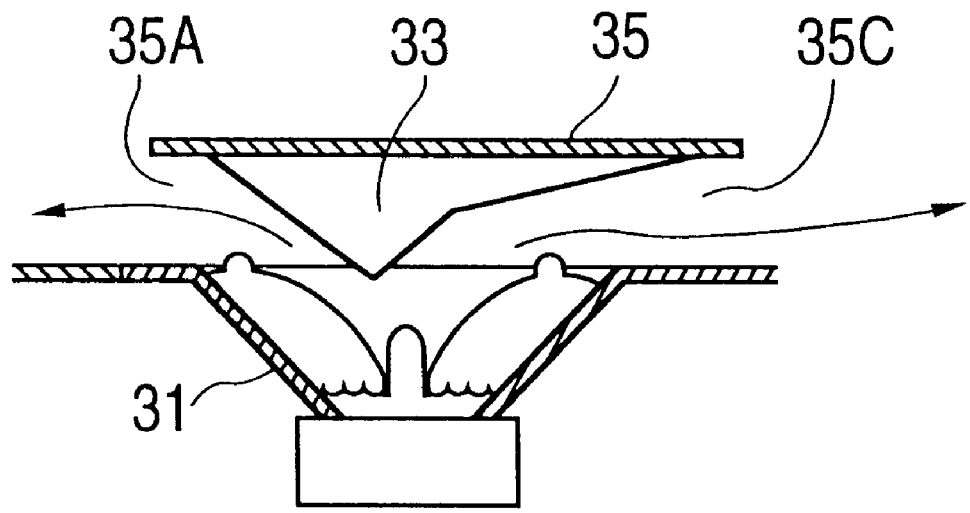
FIG. 12a shows a side cross-sectional view of another speaker arrangement embodiment according to the present invention.
Figure 12B:
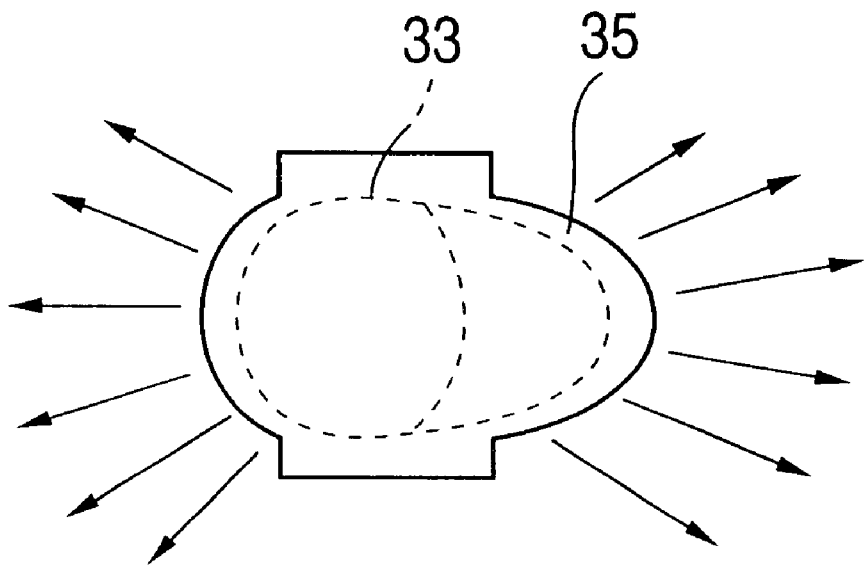

FIG. 12a is a cross sectional view and FIG. 12b a plan view of another single top speaker embodiment of a television set speaker system according to the present invention. The shape of the reflector differs as shown from side to side. As a result, the sound quality radiated from the mouth 35a and the passage mouth 35c differ according to the shape of the reflector 33 on that particular side.

Figure 13:
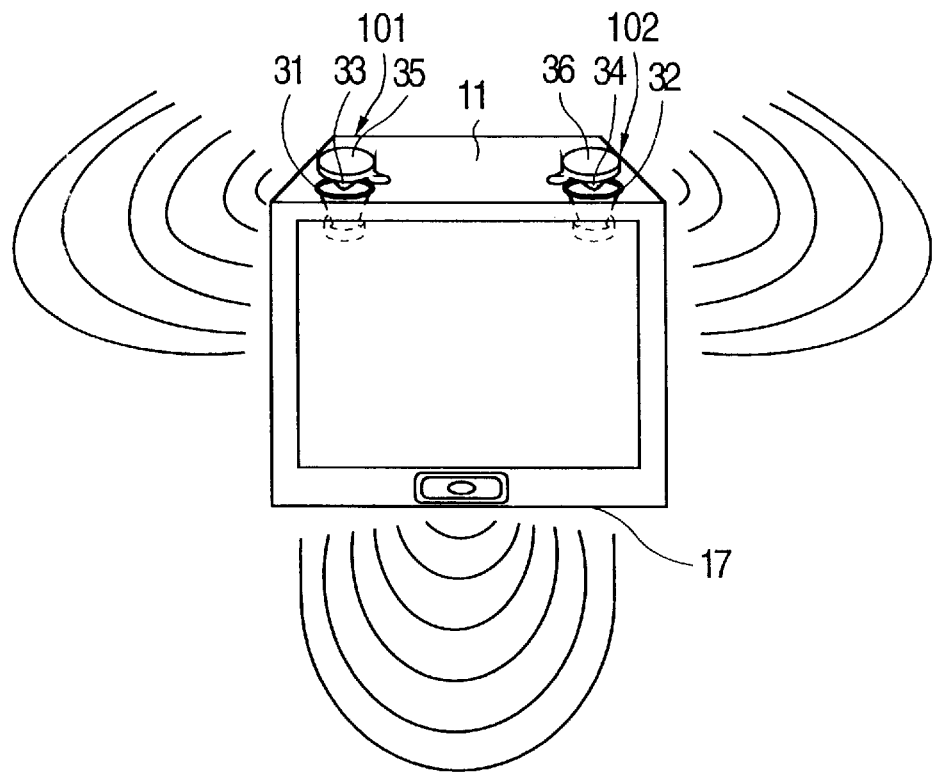
FIG. 13 shows an oblique view of a television set speaker system according to yet another embodiment of the present invention.
Figure 14:
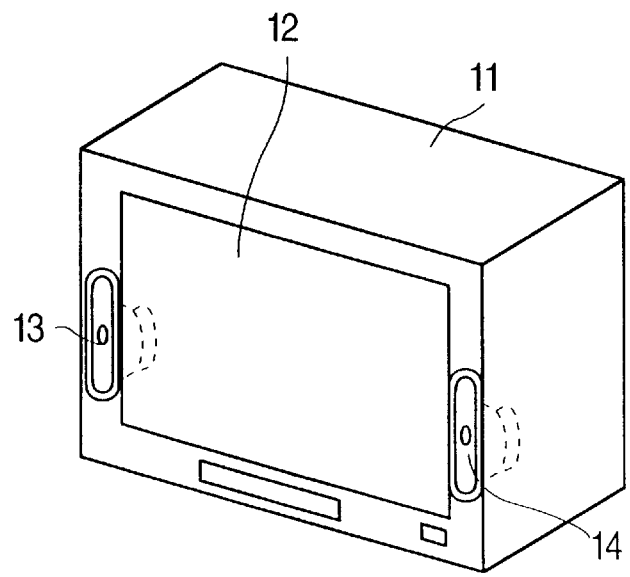
FIG. 14 shows an oblique view of a conventional television set speaker system.
Figure 18:
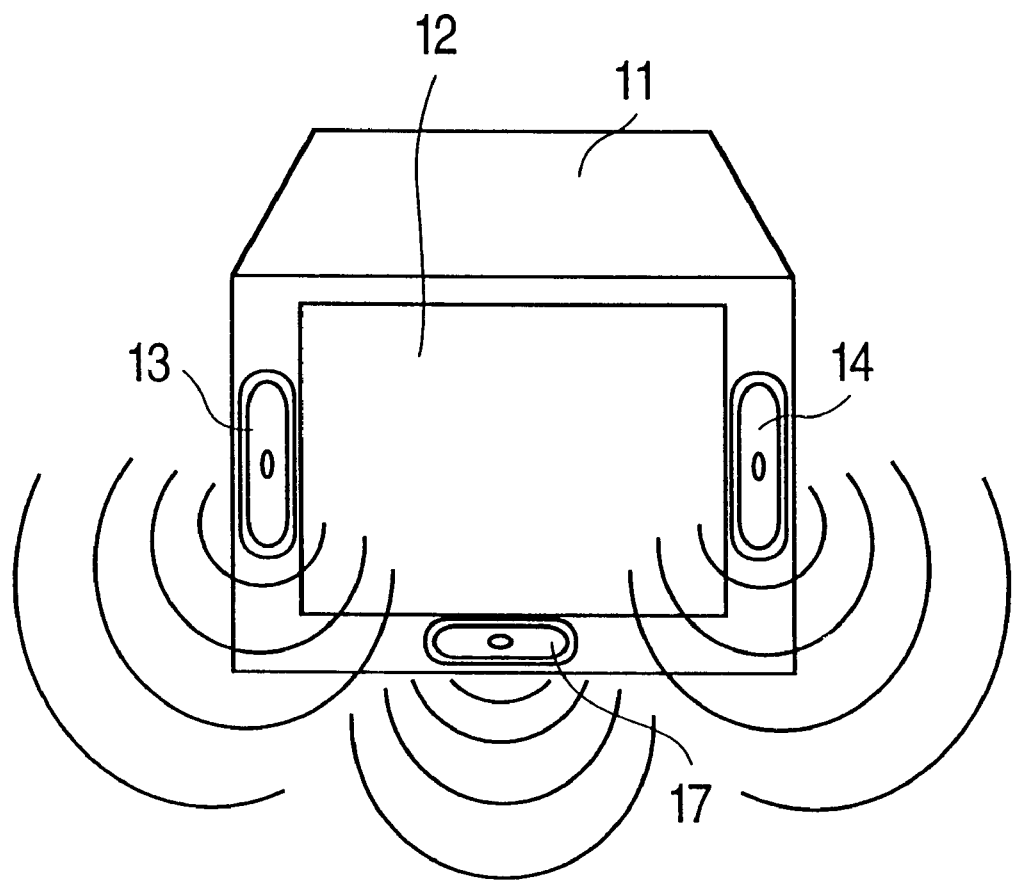
FIG. 18 shows an oblique view of another conventional television set speaker system.

FIG. 13 depicts an embodiment of the present invention applied to a television set for 3-1 system 4-channel stereo. In contrast to the prior art system of FIG. 18, FIG. 13 does not include the front speakers. Instead, reflection type directional intensifier speakers 101 and 102 positioned on top of the set cabinet 11 serve as the left and right stereo speakers. The top speakers 31 and 32 for outputting left and right stereo sound are mounted on top of the set cabinet 11 using mountings 35 and 36. The reflectors 33 and 34 located in front of the top speakers 31 and 32 can be related to the mountings as described previously, as a single element or two elements attached together.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A speaker system
   a first speaker on the front of said television set for radiating sound in a forward direction outward from said television set;
   a second speaker mounted on a left side and extending from a top surface of said television set including a first directional reflector for radiating sound outward from said television set in a first direction different from the forward direction; and
   a third speaker mounted on a right side and extending from a top surface of said television set including a second directional reflector for radiating sound outward from said television set in a second direction different from the first direction and the forward direction,
   wherein said second speaker and said third speaker each include,
      a vertically upward facing diaphragm,
      a reflector plate located in front of said diaphragm,
      a mouth for radiating sound horizontally on a periphery of said reflector plate, and
      a mounting member including a shield for reflecting radiated sound towards said mouth, wherein said reflector plate of said second speaker is rotatable on said mounting member of said second speaker, and said reflector plate of said third speaker is rotatable on said mounting member of said third speaker.

2. A speaker system
   a first speaker on the front of said television set for radiating sound in a forward direction outward from said television set;
   a second speaker mounted on a left side and extending from a top surface of said television set including a first directional reflector for radiating sound outward from said television set in a first direction different from the forward direction; and
   a third speaker mounted on a right side and extending from a top surface of said television set including a second directional reflector for radiating sound outward from said television set in a second direction different from the first direction and the forward direction,
   wherein said second speaker and said third speaker each include,
      a vertically upward facing diaphragm,
      a reflector plate located in front of said diaphragm,
      a mouth for radiating sound horizontally on a periphery of said reflector plate, and
      a mounting member including a shield for reflecting radiated sound towards said mouth, wherein said reflector plate and said mounting member of each of said second speaker and said third speaker are formed of a single molding, a molding of said reflector plate being bonded to a molding of said mounting member.

3. A speaker system
   a first speaker on the front of said television set for radiating sound in a forward direction outward from said television set;
   a second speaker mounted on a left side and extending from a top surface of said television set including a first directional reflector for radiating sound outward from said television set in a first direction different from the forward direction; and a third speaker mounted on a right side and extending from a top surface of said television set including a second directional reflector for radiating sound outward from said television set in a second direction different from the first direction and the forward direction, wherein said second speaker and said third speaker each include,
a vertically upward facing diaphragm,
a reflector plate located in front of said diaphragm,
a mouth for radiating sound horizontally on a periphery of said reflector plate, wherein said mouth of said second speaker is rotatable for adjusting the first direction, and said mouth of said third speaker is rotatable for adjusting the second direction, and a mounting member including a shield for reflecting radiated sound towards said mouth.

4. A speaker system for a television set including a display screen comprising:

a first speaker mounted on the front of said television set on the left side of said display screen for radiating sound from said television set in a first direction;

a second speaker mounted on the front of said television set on the right side of said display screen for radiating sound from said television set in the first direction;

a third speaker mounted on and extending from a top surface of said television set for radiating sound from said television set in a second direction different from the first direction; and a fourth speaker mounted on and extending from the top surface of said television set for radiating sound from said television set in a third direction different from the first and second directions, wherein a first audio signal from said television set is supplied to said first and second speakers and a second audio signal from said television set is supplied to said third and fourth speakers.

5. The speaker system according to claim 4, wherein the first audio signal is time shifted with respect to the second audio signal.

6. The speaker system according to claim 4, wherein the first audio signal is phase shifted with respect to the second audio signal.

7. A speaker system for a television set including a display screen comprising:

a first speaker mounted on the front of said television set on the left side of said display screen for radiating sound from said television set in a first direction;

a second speaker mounted on the front of said television set on the right side of said display screen for radiating sound from said television set in the first direction;

a third speaker mounted on and extending from a top surface of said television set for radiating sound from said television set in a second direction different from the first direction; and a fourth speaker mounted on and extending from the top surface of said television set for radiating sound from said television set in a third direction different from the first and second directions, wherein a first audio signal from said television set is supplied to said first and third speakers and a second audio signal from said television set is supplied to said second and fourth speakers.

8. The speaker system according to claim 7, wherein the first audio signal is time shifted with respect to the second audio signal.

9. The speaker system according to claim 7, wherein the first audio signal is phase shifted with respect to the second audio signal.

10. The speaker system according to claim 7, wherein the first direction is a forward direction.

11. The speaker system according to claim 10, wherein the forward direction is outward from said television set.

12. The speaker system according to claim 7, wherein the second direction is a horizontal direction.

13. The speaker system according to claim 7, wherein the third direction is a horizontal direction.

14. The speaker system according to claim 7, where in the second and third directions are diagonal from each other.

* * * * *